United States Patent

[11] 3,617,842

| [72] | Inventors | John Van Dyke<br>Byron Center;<br>Benard Lamfers, Jenison, both of Mich. |
|---|---|---|
| [21] | Appl. No. | 794,018 |
| [22] | Filed | Jan. 27, 1969 |
| [45] | Patented | Nov. 2, 1971 |
| [73] | Assignee | R. C. Allen Business Machines<br>Incorporated<br>Grand Rapids, Mich. |

[54] RATE GYRO ELECTRICAL CONTROL AND INDICATOR SYSTEM
6 Claims, 2 Drawing Figs.

[52] U.S. Cl. .................................................. 318/227,
318/221 E
[51] Int. Cl. ..................................................... H02p 5/40
[50] Field of Search ......................................... 318/220,
221, 227

[56] References Cited
UNITED STATES PATENTS
3,307,093 2/1967 Wright ......................... 318/221 X

| 3,414,789 | 12/1968 | Prouty ............................ | 318/221 |
| 3,421,064 | 1/1969 | Phillips .......................... | 318/221 X |
| 3,453,516 | 7/1969 | Conner ......................... | 318/221 X |

*Primary Examiner*—Oris L. Rader
*Assistant Examiner*—Gene Z. Rubinson
*Attorney*—Kinzer, Dorn and Zickert ABSTRACT: An electrical control and indicator system for a rate gyro of the kind comprising a synchronous AC spin motor and a pickoff device for developing two AC turn rate analog signals, comprising a motor start control circuit for switching a starting capacitor into and out of the motor circuit in response to changes in the stator voltages. The system further includes an inverter power supply with driver and switch circuits to energize the motor from a DC source without appreciable loading of the inverter. The demodulator of the system is a balanced differential rectifying amplifier comprising two cross-connected emitter follower stages each using a transistor as the load impedance for the emitter follower. The start control circuit, the inverter power supply, and the demodulator all comprise a single noninductive integrated silicon circuit.

PATENTED NOV 2 1971 3,617,842
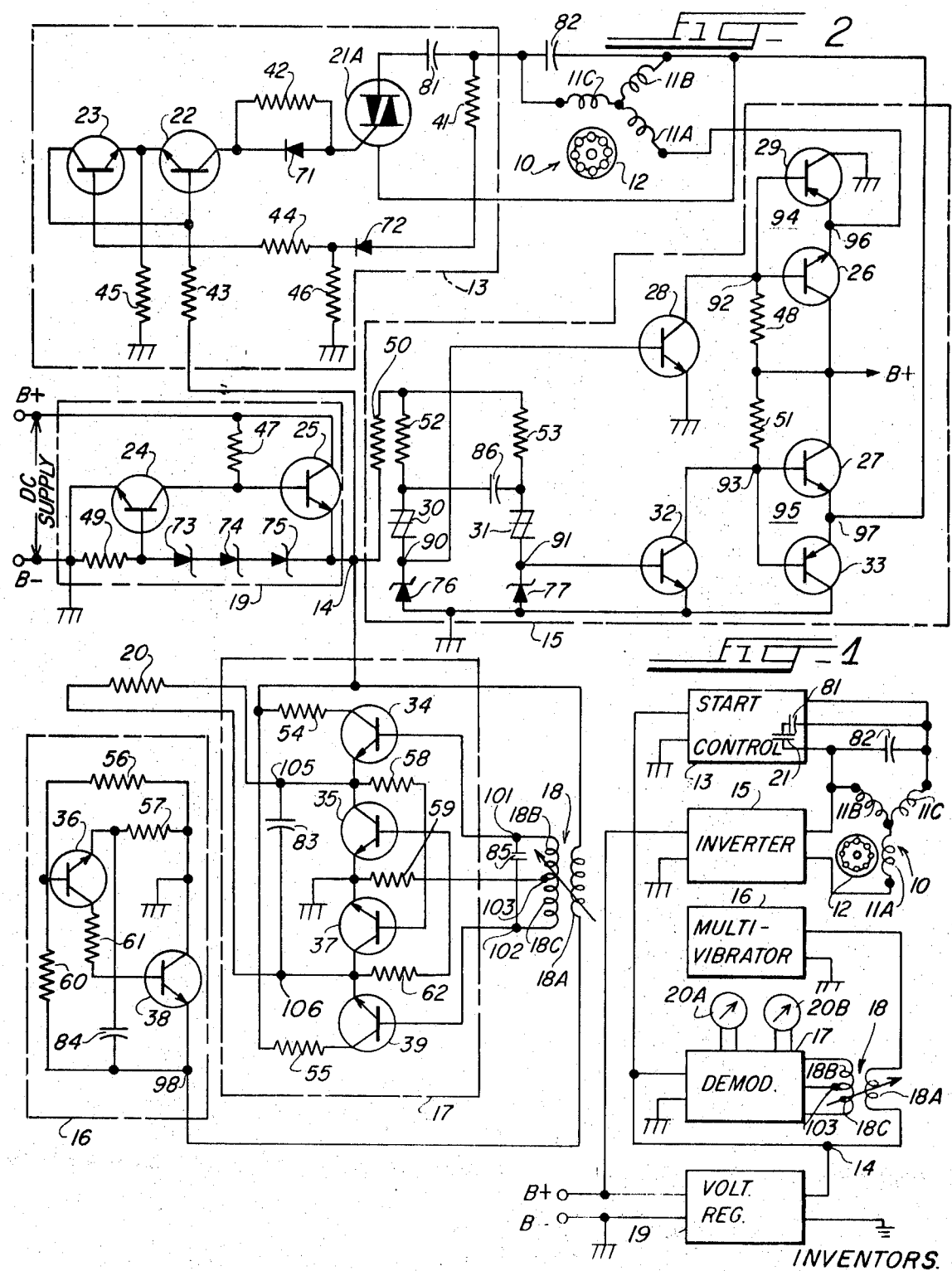
INVENTORS.
JOHN VAN DYKE
BENARD LAMFERS
BY Kinzer, Dorn & Zickert
ATTYS.

RATE GYRO ELECTRICAL CONTROL AND INDICATOR SYSTEM

BACKGROUND OF THE INVENTION

Rate gyros, and particularly those used in aircraft instrumentation, present stringent operational requirements arising partly from the adverse conditions under which they may be required to operate. For example, the electrical control and indicator system for a rate gyro may be required to function under extreme temperature variations. The conditions that produce a major temperature change may correspond with operating conditions that require the utmost accuracy from the rate gyro, particularly when the aircraft is in operational difficulty.

Nevertheless, the rate gyro and its electrical control and indicator system must be maintained at a minimum in size. The increasing complexity of aircraft instrumentation and the limited space available places a substantial premium on size reduction for any part of the overall instrumentation, including the rate gyro. Transformers and other inductive components in the control and indicator system are undesirable because they may radiate electromagnetic fields that can interfere with the operation of other adjacent instrumentation systems. Furthermore, inductive components tend to be bulky and limit the size reductions that can be accomplished in the overall system.

Ideally, the electrical control and indicator system for a rate gyro should be of minimum size and preferably should be based entirely upon solid state components to afford maximum ruggedness and reliability. Power losses in the system should be held to a minimum; that is, efficiency of the overall system should be maintained as high as possible to minimize the load on the electrical system of the aircraft. Transformers and other inductive components are preferably avoided whenever possible. The rate gyro should come up to synchronous speed as rapidly as possible and should afford maximum torque, from the spring motor, whenever the rotational speed is reduced to any appreciable extent.

SUMMARY OF THE INVENTION

It is a principal object of the invention, therefore, to provide a new and improved electrical control and indicator system for a rate gryo employing an AC spin motor energized from a DC power supply, in which the start control circuit, the inverter power supply, and the demodulator are all combined in a single integrated circuit of minimum size requiring minimum power for highly efficient operation.

Another object of the invention is to provide a new and improved start control for a rate gyro in which a starting capacitor is switched into and out of the motor circuit by a semiconductor gate device in response to changes in voltage in the stator windings of the motor without requiring the use of a current transformer or other inductive components.

A further object of the invention is to provide a new and improved differential demodulator for a rate gyro that affords an inherently self-rectifying circuit and that provides a direct DC analog of the turn rate to which the gyro is subjected. A particular feature of the demodulator of the present invention is the use of an emitter follower circuit in which the usual resistive load impedance in the emitter circuit is replaced by a transistor and the conductivity of that transistor is controlled from another emitter follower that consititutes the other half of a differential amplifier.

An additional object of the invention is to afford a full-wave transformerless AC power supply for the spin motor of a rate gyro which requires no inductive components and which affords full-wave energization of the motor with losses limited to the saturation voltages of solid state switching devices incorporated in the inverter circuit of the power supply.

Accordingly, the invention is directed to an electrical control and indicator system for a rate gyro of the kind comprising a DC power supply, an AC spin motor including a rotor inductively coupled to a plurality of stator windings and a starting capacitor electrically connected to one of the stator windings in a starting circuit, and a pickoff device for developing first and second AC analog signals that vary in amplitude, relative to each other, as an analog of the turn rate input to the gyro. The system comprises a start control circuit including a normally conductive triac connected in series with the starting capacitor, a sensing circuit for developing a start control signal representative of the voltage across the aforesaid stator windings, and a gating circuit for actuating the triac to nonconductive condition whenever the start control signal exceeds a given amplitude. The system further comprises an inverter power supply for the spin motor including a stable-frequency oscillator energized from the DC power supply, a pair of driver amplifiers actuated by the oscillator to develop two synchronous AC drive signals of rectangular waveform, and a pair of complementarily symmetrical switching circuits each responsive to one of the drive signals for conjointly developing a full-wave output signal of substantially rectangular waveform used to energize the spin motor. A demodulator is coupled to the pickoff device and comprises a balanced differential rectifying amplifier for developing a DC analog of the turn rate input to the gyro from the aforementioned AC analog signals. Each half of the differential amplifier is an emitter follower including an amplifier transistor having a load transistor as its principal load impedance and having a gating circuit for controlling the conductivity of the load transistor in accordance with the conductivity of the amplifier transistor in the other emitter follower. Substantially all of the circuits recited above are incorporated in a single noninductive integrated silicon circuit.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a block diagram of a rate gyro, partly schematic, constructed in accordance with one embodiment of the invention, and FIG. 2 is a detailed schematic diagram of a rate gryo system corresponding to that of FIG. 1.

DESCRIPTION OF THE PREFERRED EMBODIMENT

The electrical control and indicator system for a rate gyro that is illustrated in FIG. 1 includes a synchronous AC spin motor 10, comprising three field windings 11A, 11B and 11C inductively coupled to a rotor 12. Motor 10 is preferably a hysteresis motor, but may constitute any other desired form of motor suitable for use in a rate gyro. Though windings 11A–11C are shown in a Y-connection, a delta connection can be used if desired. A two-winding motor can also be employed.

Motor windings 11A AND 11B are electrically connected to an AC supply constituting an inverter circuit 15. Inverter 15 is energized from an appropriate DC supply at terminals B+ and B−. Of convenience in illustration of the circuit, the B− terminal is shown as constituting system ground.

In the circuit of FIG. 1, winding 11C, the third field winding of motor 10, is utilized in a 113 essentially similar to a starting winding for a single-phase motor. A fixed capacitor 82 is connected from the input terminal of winding 11C to the AC supply, inverter 15, the connection being made at the same inverter terminal as is connected to winding 11B. A starting capacitor 81 is incorporated in a motor starting circuit, in parallel with capacitor 82. But the starting comprising capacitor 81 extends through a start control 13 that is utilized to disconnect capacitor 81 from motor winding 11C under running conditions, as generally illustrated by the contacts 21 in series with capacitor 8.

The rate gyro system of FIG. 1 further includes a pickoff transformer 18 for the gyro. Transformer 18 may be of conventional construction and is shown to include a primary winding 18A and two secondary windings 18B and 18C connected to each other at a center terminal 103. The construction of the pickoff transformer is such that the coupling from primary winding 18A to the two secondaries 18B and 18C is uniform and equal when the gyro is subject to no angular velocity or rate input. When the gyro is subject to an angular velocity, the coupling from the primary winding of the transformer to the two secondaries becomes unbalanced to indicate both the direction and the amplitude of the input turn rate to which the gyro is subjected. Thus, the AC signals induced in windings 18B and 18C constitute an analog of the turn rate to which the gyro is subjected.

It should be understood that the illustration of pickoff transformer 18, in FIGS. 1 and 2, is substantially simplified from the physical construction actually employed. The pickoff may, for example, comprise a series of variable transformers inductively coupled to a rotor of irregular shape; rotation of the rotor increases coupling in some of the transformers and decreases coupling in others. But the basic operation can be readily understood from the three-winding construction illustrated.

An input signal to pickoff transformer 18 is supplied from a multivibrator 16 that is electrically connected to the primary winding 18A of the pickoff transformer. Winding 18A is returned to the positive terminal of a DC voltage regulator 19. Voltage regulator 19 also serves as a power supply for start control 13 and for a demodulator 17. Demodulator 17 is coupled to the second ary windings of the pickoff transformer 18 and drives an appropriate rate-indicating instrument or instruments as illustrated by the devices 20A and 20B in FIG. 1. The number of indicating instruments required in dependent upon the instrumentation system in which the rate gyro is incorporated; in a typical aircraft application, two such instruments may be used.

Considering briefly the operation of the rate gyro system illustrated in FIG. 1, it is seen that spin motor 12 is energized from inverter 15. When the system is first placed in operation, the voltage across motor winding 11C is sensed in start control 13. Under starting conditions, this voltage is quite low, as long as the low-voltage condition continues, the start control maintains switch 21 closed and thus couples starting capacitor 81 into the motor circuit. The addition of starting capacitor 81 in parallel with running capacitor 82 affords increased starting torque for spin motor 10 and enables the spin motor to reach its synchronous speed more rapidly than would otherwise be possible.

As spin motor 10 nears synchronous speed, the voltage across the motor winding 11C connected to start control 13 increased markedly. This increased voltage is sensed in start control 13 and is employed to open the switch 21 and thus disconnect starting capacitor 81 from the motor circuit. For normal running conditions, therefore, capacitor 81 is not utilized in the motor circuit. This permits realization of the optimum synchronous torque for motor 10.

Demodulator 17 is, essentially, a differential rectifying amplifier for combining the two input signals from transformer windings 18B and 18C in bucking relation and detecting the resultant. As long as the gyro is subject to no angular velocity, the AC analog signals induced in secondary windings 18B and 18C of pickoff transformer 18 are equal in amplitude. Under these conditions, the output signal from the demodulator is zero and the indicating instruments 20A and 20B show a zero-rate performance.

Whenever a turn rate is applied to the gyro, a differential in amplitude is developed, between the AC analog signals induced in windings 18B and 18C of the pickoff transformer, which is proportional to the turn rate. This signal differential is demodulated, detected and amplified in demodulator 17, producing a DC analog signal having an amplitude proportional to the turn rate and a polarity representative of the direction of the turn rate. It is this DC analog signal that is supplied to indicators 20A and 20B to afford a positive indication of the angular velocity (turn rate) to which the gyro is subject.

In the specific circuit arrangement for the rate gyro system that is shown in FIG. 2, the switching device 21 of start circuit 13 (FIG. 1) is shown to comprise a triac 21A. A triac is a bilaterally conductive signal-controlled semiconductor switch; as used in this application it is intended to include any other operationally similar semiconductor device such as a quadrac, etc. One of the main input-output electrodes of the triac is connected to starting capacitor 81 and the other main electrode is connected back to the motor circuit and specifically to motor winding 11B. The gate electrode of the triac is connected to the collector of a gate transistor 22 through a diode 71; a resistor 42 is connected in parallel with diode 71. The emitter of transistor 22 is connected to the emitter of an auxiliary gate transistor 23; the emitters of transistors 22 and 23 are returned to system ground through a resistor 45. The base of transistor 22 is connected to the collector of transistor 23 and is also connected through a resistor 43 to the positive terminal 14 of the DC voltage regulator 19.

The base of the auxiliary gate transistor 23 is connected in a sensing circuit that senses the operating voltage of motor winding 11C. This sensing circuit is a voltage divider that includes, in series, beginning at the external terminal o winding 11C, a resistor 41, a diode 72, and a resistor 46 that is returned to system ground. A resistor 44 is connected from the base of transistor 23 to the common terminal between diode 72 and resistor 46 in the sensing circuit.

Voltage regulator 19 comprises two transistors 24 and 25, preferably silicon power transistors. The emitter of transistor 24 is connected to the B− supply, here taken as system ground. The base of transistor 24 is connected to a resistor 49 which is returned to the B− terminal. The collector of transistor 24 is connected to the base of transistor 25 and is also connected to the B+ supply by a resistor 47.

The collector of transistor 25, in voltage regulator 19, is connected to B+ supply terminal. The emitter of transistor 25 is connected to the base of transistor 24 through three cascaded zener diodes 73, 74 and 75 affording a voltage reference. The emitter of transistor 25 is also connected to the terminal 14 that constitutes the positive-polarity output terminal of the voltage regulator. In a typical operating circuit, regulator 19 restricts voltage changes at terminal 14 to less than 1 percent over an input range of more than 35 percent (e.g., 21 to 29 volts).

The circuit for the inverter 15, as shown in FIG. 2, comprises two silicon bilateral switches 30 and 31. These silicon bilateral switches, sometimes referred to hereinafter by the designation SBS, each constitute a planar silicon monolithic integrated circuit having the electrical characteristics of a bilateral thyristor. These devices are capable of switching at relatively low voltages and are characterized by a very low temperature coefficient, affording high stability of switching voltage over a wide temperature range, as may be necessary in many applications including aircraft instrumentation.

The input to inverter 15 is derived from voltage regulator 19. The positive-polarity terminal 14 of the voltage regulator is connected through a resistor 50 to two parallel input resistors 52 and 53 that are in turn connected to the SBS devices 30 and 31, respectively. A capacitor 86 is connected across resistors 52 and 53; capacitor 86 and the two resistors 52, 53 afford a frequency-determining circuit for the inverter. SBS 30 is returned to system ground (B−) through a zener diode 76 and SBS 31 is returned to system ground through a zener diode 77. This affords an oscillator constituting a self-commutating flip-flop circuit, having output terminals 90 and 91, in which SBS 30 and SBS 31 fire alternately. When one SBS fires, the other SBS is cut off by the current through capacitor 86, which causes an instantaneous voltage change at the anode of the other device.

Inverter 15 further comprises a driver amplifier stage including two transistors 28 and 32. The base of transistor 28 is connected to the oscillator output terminal 90. The emitter of transistor 28 is returned to system ground. The collector is connected to the input terminal 92 of a bridgelike switching circuit 94. Similarly, the base of the amplifier transistor 32 is connected to the oscillator output terminal 91. The emitter of transistor 32 is connected to system ground and the collector is connected to an input terminal 93 of a bridge switching circuit 95.

The switching bridge 94 includes two complementary transistors 26 and 29, each having its base connected to input terminal 92. The emitters of transistors 26 and 29 are connected to each other and to an output terminal 96 that is connected to motor winding 11A. The collector of transistor 29 is returned to system ground and the collector of transistor 26 is returned to the B+ supply. The bases of transistors 26 and 29 are also connected to the B+ supply through a resistor 48.

A similar arrangement is utilized in the other bridge switching circuit 95, which comprises tow complementary transistors 27 and 33. The bases of transistors 27 and 33 are connected to each other at terminal 93, which is connected to the B+ supply through a resistor 51. The collector of transistor 27 is connected to B+ and the collector of transistor 33 is connected to B− (system ground). The emitters of transistors 27 and 33 are connected together at an output terminal 97 that is connected to motor winding 11B.

Multivibrator 16, in the construction illustrated in FIG. 2, comprises two transistors 36 and 38. The base of transistor 36 is connected to a resistor 56 that is returned to system ground. The emitter of transistor 36 is connected to a resistor 57 that is returned to system ground. The emitter of transistor 36 is also connected to a capacitor 84 that is in turn connected to an output terminal 98. Output terminal 98 is connected to one terminal of the primary winding 18A of pickoff transformer 18, winding 18A having its other terminal connected to the positive-polarity output terminal 14 of the voltage regulator 19. The base electrode of transistor 36 is also connected to output terminal 98 through a resistor 60. The collector of transistor 36 is multivibrator 16 is connected through a resistor 61 to the base of transistor 38. The collector of transistor 38 is connected to system ground. The emitter of this transistor is directly connected to the output terminal 98 for the multivibrator.

Demodulator 17 is balanced self-rectifying differential amplifier. It comprises two amplifier transistors 34 and 39 and two switching transistors 35 and 37, sometimes referred to hereinafter as load transistors. The base of amplifier transistor 34 is connected to the end terminal 101 of the secondary winding 18B of pickoff transformer 18. The collector of transistor 34 is connected through a resistor 54 to the positive-polarity terminal 14 of the voltage regulator 19. The emitter of transistor 34 is connected to one output terminal 105 for the demodulator, terminal 105 in turn being connected to the instrument load for the rate gyro, respresented in FIG. 2 by the single resistor 20.

Amplifier transistor 39, in demodulator 17, has its base connected to the end terminal 102 of the secondary winding 18C of pickoff transformer 18. The collector of transistor 39 is connected through a resistor 55 to the regulated positive-polarity supply terminal 14. The emitter of transistor 39 is connected to a second output terminal 106 for the demodulator circuit, terminal 106 being connected to load 20. A filter capacitor 83 is connected across the output terminals 105 and 106 of the demodulator.

In addition to the connections described above, the emitter of amplifier transistor 34 is mounted to the collector of its load transistor 35 and, through a resistor 58, to the base of the other load transistor 37. Similarly, the emitter of amplifier transistor 39 is electrically connected to the collector of its load transistor 37 and is connected through a resistor 62 to the base of the other load transistor 35. The emitters of load transistors 35 and 37 are electrically connected to each other and are returned to system ground (B−). The demodulator circuit is completed by a bias resistor 59 that connects the common center terminal 103 of the secondary windings 18B to 18C of pickoff transformer 18 back to system ground. A smoothing capacitor 85 is connected across the transformer output terminals 101 and 102.

In considering the operation of the rate gyro system of FIG. 2, perhaps the best starting point is the AC power supply for spin motor 10, inverter 15. The initial stage of the inverter is the oscillator comprising SBS devices 30 and 31, resistors 52 and 53, diodes 76 and 77, and capacitor 86. As noted above, each SBS becomes conductive at a given fixed voltage. 53, circuit functions as a free-running multivibrator, operating at a frequency determined by the impedances of the resistors 52 and 53 and the capacitor 86. Each of the zener diodes 76 and 77 provides a stable breakover voltage for the respective SBS devices to which it is connected. Furthermore, the zener diodes provide clamping for transistors 28 and 32 in the buffer amplifier or driver stage of the inverter. The circuit illustrated affords high frequency stability over wide ranges of ambient temperature, the frequency variation being less than 5 percent over a range from −55° to +100° C.

The output signal from the oscillator, in inverter 15, is a signal of rectangular waveform that switches the driver transistors 28 and 32 between conduction and cut off in alternation with each other. Actuation of the driver transistors between conduction and cut off produces two synchronous AC drive signals of substantially rectangular waveform, displaced 180° in phase from each other. These AC drive signals actuate the bridge switching circuits 94 and 95 connected to the windings 11A and 11B of spin motor 10.

Thus, in any half cycle of the oscillator in which driver transistor 28 is driven to conduction the positive voltage at input terminal 92 is reduced materially by the drop across resistor 48, effectively applying a negative-going signal to the base electrode of each of the switching transistors 29 and 26. As a consequence, transistor 26 is driven to cut off and the complementary transistor 29 is driven to saturated conductive condition. With transistor 29 conductive and transistor 26 cut off, a negative-going pulse is effectively supplied to motor winding 11A. That is, winding 11A is effectively connected to the B− supply (system ground) through transistor 29.

In the same half cycle in which transistor 28 is driven conductive, the other driver transistor 32 is cut off. When this occurs, the instantaneous positive voltage at terminal 93 increases materially, since there is now no appreciable current through resistor 51, effectively applying a positive-going signal to the base electrode of each of the transistors 27 and 33. Consequently, transistor 27 is driven conductive and transistor 33 is cut off. Accordingly, a positive polarity connection is made from B+ through transistor 27 to motor winding 11B, completing a circuit for energization of the motor windings.

On the next half cycle, the drive transistors 28 and 32 are reversed in their operating conditions. That is, driver transistor 28, in the next half-cylce, is driven to cut off and driver transistor 32 is driven conductive. This produces a positive-going signal at the bridge input terminal 92 and a negative-going signal at the bridge input terminal 93. In consequence, switching transistors 27 and 29 are driven to cut off and switching transistors 26 and 33 are driven to conductive condition, supplying an energizing signal of opposite polarity to motor windings 11A and 11B by reversing the effective connections to the motor windings from B+ and B−. In each half cycle of the inverter operation, therefore, the transistors pairs 27, 29 and 26, 33 are driven conductive in alternation, supplying a full-wave alternating current of rectangular waveform to spin motor 10.

Inverter 15 affords several advantages with respect to previously known circuit arrangements. There are no transformers or other inductive components required to accomplish the requisite switching action for energizing the motor with the required AC current. The particular driver and switching circuits employed eliminate loading of the free-running multivibrator that constitutes the initial oscillator stage of the inverter. With full-wave switching, the losses in the inverter are quite low, being limited to the saturation voltages of the transistors. Moreover, an excellent impedance match is readily obtained between the high impedance of the driver circuits comprising transistors 28 and 32 and the low impedance of motor 10. The use of the complementarily symmetrical bridge circuits 94, 95 in the output of the inverter is of particular advantage because it permits operation from a single collector voltage source, the B+ supply, while retaining the many advantages noted above. Temperature variations are effectively eliminated.

Motor start control 13 also affords substantial operational advantages in comparison with conventional starting circuits for the gyro spin motor. When the rate gyro is first placed in operation, the principal switching device in the start control, triac 21A, is biased full on so that capacitor 81 is effectively connected in the motor circuit in parallel with running capacitor 82. That is, the positive voltage on the base of the auxiliary gate transistor 23 is quite low and that transistor is effectively cut off, whereas gate transistor 22 is biased to conduction and maintains triac 21A conductive.

As motor 10 builds up in speed, the voltage across resistor 46, which is proportional to the voltage across motor winding 11C, increases. The resulting increase in the positive voltage at the base of the auxiliary gate transistor 23 ultimately drives that transistor to conduction. This decreases the positive voltage on the base of gate transistor 22, which is ultimately driven to cut off. Thus, as the motor approaches synchronous speed, triac 21A is driven nonconductive and starting capacitor 81 is effectively cut off from the motor circuit. The circuit parameters are usually selected to switch triac 21A to cut off at about 75 percent of synchronous speed for spin motor 10.

Start control 13, as applied to spin motor 10, requires extremely low current consumption as compared wit other starting circuit arrangements. It requires no inductive components and embodies no critical tolerances with respect to the impedance requirements of the circuit. Nevertheless, full cut off of the switch, triac 21A, is afforded and optimum performance of the motor is assured, with the best starting torque and the best synchronous torque for a given motor.

The pickoff excitation and demodulation circuits for the system, as provided by multivibrator 16 and demodulator 17, also afford substantial operational advantages in comparison with previously known circuits employed in systems of this kind. Multivibrator 16 is of generally conventional construction, constituting a complementary multivibrator operating at a fixed frequency. In this instance, the frequency of the multivibrator is preferably one kilohertz, although other operating frequencies can be utilized if preferred.

Demodulator 17, on the other hand, is substantially different from conventional differential amplifiers and demodulators. Each half of the differential amplifier includes an emitter follower (amplifier transistors 34,39), this configuration being used for impedance matching purposes. The external load is that afforded by the indicating instrument or instruments and represented in FIG. 2 by resistor 20. But the individual emitter followers in demodulator 17 are not of conventional construction. Each includes a polarity-sensitive transistor switching network, afforded by the load transistors 35 and 37.

When the input rate to the gyro is zero, the voltages across the secondary windings 18B and 18C of pickoff transformer 18 are equal. Consequently, the voltages supplied to the base electrodes of transistors 34 and 39 are equal in amplitude and the current in the external load 20 connected to the emitters of these two transistors is zero.

When a turn rate is applied to the gyro, an amplitude differential is created in the AC analog signals induced in the two secondary windings of pickoff transformer 18. It may be assumed that, for a turn rate input of a given direction, the AC signal across secondary winding 18B is increased in amplitude in relation to the signal developed across secondary winding 18C. In each cycle of the signals from the pickoff transformer, therefore, the collector-emitter current of transistor 34 is greater than the corresponding current in transistor 39. For a turn rate input of opposite direction, a reverse relation is obtained and the current through transistor 39 exceeds that through transistor 34. Thus, the unbalanced conductivity relationship established in transistors 34 and 39 as the result of application of a turn rate to the gyro develops a DC current in the external load 20 that is directly proportional to the input turn rate and that has a polarity representative of the direction of the turn rate.

For a more specific consideration of the operation of demodulator circuit 17, it may be assumed that the gyro is subject to a turn rate that produces an appreciably higher voltage and current in secondary winding 18B than are induced in secondary winding 18C. On negative-going half cycles of the AC signal from the pickoff transformer, no output current is produced due to the inherent rectifying action of the amplifier transistors 34 and 39. On positive-going half cycles, however, transistor 34 is driven conductive and develops a relatively higher current, in its emitter-conductor path, than transistor 39. This current effectively drives transistor 37 to conduction, since it affords a positive-going signal on the base of transistor 37, through the gating circuit comprising resistor 58. Transistor 35, on the other hand, is maintained at a much lower conduction level, due to the substantially smaller current that is passed by transistor 39 and the gating circuit afforded by resistor 62.

Under these conditions, with transistors 34 and 37 highly conductive and transistors 35 and 39 at a reduced conduction level or even cut off, a substantial current passes through load 20, representing the indicator instruments 20A and 20B (FIG. 1); the direction of this current is from terminal 105 to terminal 106. The filter capacitor 83 assures the application of a relatively smooth DC current to the indicating instruments. Furthermore, because transistor 37 is in a highly conductive condition, virtually all of the current through transistor 34 is supplied to load 20 and only a minor portion of that current passes through transistor 35.

If the amplitude of the AC analog signal at terminal 102 increases appreciably relative to the signal at terminal 101, on the other hand, the reverse operation takes place in demodulator 17. Under these circumstances, amplifier transistor 39 and load transistor 35 are driven to a highly conductive condition and transistors 34 and 37 are maintained in a state of reduced conductivity or even cut off. Consequently, the DC current to load 20 flows from output terminal 106 to output terminal 105, the reversal in polarity indicating a reversal in the direction of the turn rate output to the gyro.

In demodulator 17, rectification is performed internally in the transistors, particularly amplifier transistors 34 and 39, and adequate demodulation filtering is afforded by capacitor 83. Because the AC outputs from the pickoff transformer constitutes a true analog of the turn rate, with amplitude and phase relationships corresponding, respectively, to the rate and the direction of the input to the gyro, the DC voltage across the external load 20 is a true analog of the input turn rate.

The utilization of the load transistors 35 and 37 in the differential amplifier of demodulator 17, instead of the resistive elements of conventional emitter-follower amplifiers, affords an efficiency of operation that is approximately double that available with an ordinary differential amplifier. That is, virtually all of the available current is directed to flow through the external resistor 20; losses in the external emitter resistors of the amplifier are effectively minimized.

Most of the components of the circuit illustrated in FIG. 2 are preferably constructed as a single unified and integrated circuit. Thus, in the preferred construction for this embodiment of the invention, all of the illustrated circuits for start control 13, inverter 15, multivibrator 16, demodulator 17 and regulator 19 are afforded by a single silicon integrated circuit; the only exceptions, for practical construction, are starting capacitor 81 and resistors 41 and 46, all in start control 13.

We claim:
1. An electrical control and indicator system for a rate gyro of the kind comprising a DC power supply, an AC spin motor including a rotor inductively coupled to a plurality of stator windings and a starting capacitor electrically connected to one of said stator windings in a starting circuit, and a pickoff device for developing first and second AC analog signals that vary in amplitude, relative to each other, as an analog of the turn rate input to the gyro, said system comprising:
   a start control circuit including a normally conductive triac connected in series with said starting capacitor, a sensing circuit for developing a start control signal representative of the voltage across said one stator winding, and gating means for actuating said triac to nonconductive condition whenever said start control signal exceeds a given amplitude;
   an inverter power supply for said spin motor comprising a stable-frequency oscillator energized from said DC power supply, a pair of driver amplifiers actuated by said oscillator to develop two synchronous AC drive signals of rectangular waveform, and a pair of complementarily symmetrical switching circuits each responsive to one of said drive signals, for developing a full-wave output signal of generally rectangular waveform for energizing said spin motor;
   and a demodulator, coupled to said pickoff device, comprising a balanced differential rectifying amplifier for developing a DC analog of the turn rate input to said gyro from said AC analog signals, each half of said differential amplifier including an amplifier transistor having a load transistor as its principal load impedance and having a gating circuit for controlling the conductivity of the load transistor in accordance with the conductivity of the amplifier transistor in the other half of the amplifier;
   substantially all of said start control circuit, said inverter power supply, and said demodulator comprising a single, noninductive integrated silicon circuit.

2. An electrical control and indicator system for a rate gyro, according to claim 1, in which said sensing circuit comprises a voltage divider connected from the end terminal of one stator winding to a plane of reference potential, and in which said gating means for said start control circuit includes a normally conductive gate transistor connected in series with the gate electrode of said triac, and a normally nonconductive auxiliary gate transistor connected to said gate transistor and to said voltage divider, said auxiliary gate transistor being driven conductive and actuating said gate transistor to cut off whenever said start control signal exceeds said given amplitude.

3. An electrical control and indicator system for a rate gyro, according to claim 1, in which said inverter power supply driver amplifiers each include a single transistor, said drive signals being displaced 180° in phase relative to each other, and in which said switching circuits each include two complementary transistors, all of said transistors having a single collector supply.

4. An electrical control and indicator system for a rate gyro, according to claim 1, in which each half of said demodulator is an emitter follower with the load transistor connected between the emitter of the amplifier transistor and the DC power supply, and in which each gating circuit comprises a resistor connecting the emitter of the amplifier transistor in one half of the demodulator to the base of the load transistor in the other half of the demodulator.

5. A control system for a rate gyro of the kind comprising an AC spin motor including a rotor inductively coupled to a plurality of stator windings and a starting capacitor electrically connected to one of said stator windings in a starting circuit, said control system comprising:
   a semiconductor gate device normally biased to conductive condition and comprising input and output electrodes connected in series with said starting capacitor in said starting circuit, and further comprising a gate electrode; a sensing circuit, electrically one stator winding, for developing a start control signal having an amplitude representative of the instantaneous voltage across at least one of said stator windings;
   and a gating circuit, coupling said sensing circuit to said gate electrode, for actuating said gate device to a nonconductive condition whenever the voltage across said stator winding exceeds a given value indicative of a predetermined motor speed;
   said gate device being a triac, and said gating circuit comprising a gate transistor connected in series with said gate electrode and actuated between an initial conductive condition and a nonconductive condition in response to variations in said start control signal above and below a given amplitude representative of said predetermined motor speed.

6. A rate gyro control system according to claim 5 in which said sensing circuit comprises a resistive voltage divider connected from the end terminal of one stator winding to a plane of reference potential, and in which said gating circuit further comprises an auxiliary gate transistor connected to the base of said gate transistor, the base of said auxiliary gate transistor being connected to said voltage divider.

* * * * *

CERTIFICATE OF CORRECTION

Patent No. 3,617,842　　　　　　　　　　　　Dated November 2, 1971

JOHN VAN DYKE  and  BENARD LAMFERS

It is certified that errors appear in the above identified patent and that said Letters Patent are hereby corrected as shown below:

In the Specification:
Column 2, line 64, "Of" should be --For--;
　　　　　line 67, "113" should be --manner--;
　　　　　line 73, after "starting" insert --circuit.
Column 3, line 2, "8" should be --81--.
Column 4, line 50, after "The" (1st occurrence) insert
　　　　　--operating--.
Column 5, line 41, "is" (1st occurrence) should be --in--;
　　　　　line 69, "mounted" should be --connected--.
Column 6, line 12, "53," should be --The--
　　　　　line 23, "-55° to +100°C" should read
　　　　　-- -55°C to 100°C --.

In the Claims:
Column 10, line 25, after "electrically" insert
　　　　　--connected to said--.

Signed and sealed this 18th day of April 1972.

(SEAL)
Attest:

EDWARD M. FLETCHER, JR.　　　　　　　ROBERT GOTTSCHALK
Attesting Officer　　　　　　　　　　Commissioner of Patents